United States Patent [19]
Ottinger

[11] Patent Number: 6,070,231
[45] Date of Patent: May 30, 2000

[54] METHOD AND APPARATUS FOR PROCESSING MEMORY REQUESTS THAT REQUIRE COHERENCY TRANSACTIONS

[75] Inventor: James M. Ottinger, Lawrenceville, Ga.

[73] Assignee: Intel Corporation, Santa Clara, Calif.

[21] Appl. No.: 08/982,446

[22] Filed: Dec. 2, 1997

[51] Int. Cl.[7] .................................................. G06F 12/08
[52] U.S. Cl. .......................................... 711/141; 711/144
[58] Field of Search .................................... 711/141, 119, 711/121, 150, 146, 169, 122, 144, 145

[56] References Cited

U.S. PATENT DOCUMENTS

| | | | |
|---|---|---|---|
| 5,504,872 | 4/1996 | Galles et al. | 395/472 |
| 5,530,933 | 6/1996 | Frink et al. | 711/141 |
| 5,544,345 | 8/1996 | Carpenter et al. | 395/477 |
| 5,546,546 | 8/1996 | Bell et al. | 710/112 |
| 5,590,379 | 12/1996 | Hassler et al. | 395/851 |
| 5,737,758 | 4/1998 | Merchant | 711/146 |
| 5,737,759 | 4/1998 | Merchant | 711/146 |
| 5,796,977 | 8/1998 | Sarangdhar et al. | 711/141 |
| 5,797,026 | 8/1998 | Rhodehamel et al. | 711/146 |
| 5,848,434 | 12/1998 | Young et al. | 711/144 |
| 5,905,876 | 5/1999 | Pawlowski et al. | 711/141 |

*Primary Examiner*—Eddie P. Chan
*Assistant Examiner*—Yamir Encarnacion
*Attorney, Agent, or Firm*—Blakely, Sokoloff, Taylor & Zafman LLP

[57] ABSTRACT

A method for processing memory requests and a memory controller that implements the method are disclosed. The method includes the steps of (a) receiving a first memory request from a first bus, (b) issuing a first coherency request on a second bus in order to process the first memory request, (c) storing the first coherency request in a storage area of the memory controller that is configured to receive memory requests from the second bus, and (d) processing the first coherency request from the storage area.

25 Claims, 4 Drawing Sheets

METHOD AND APPARATUS FOR PROCESSING MEMORY REQUESTS THAT REQUIRE COHERENCY TRANSACTIONS

BACKGROUND OF THE INVENTION

The present invention relates generally to a memory controller, and more particularly to a method and apparatus for processing memory requests that require coherency transactions.

In modern computer systems, the number of components that may access memory is growing. This growth has lead to an architecture where components of the computer system are split into various nodes with each node having its own memory. Typically, these computer systems are implemented such that one component may access memory of another node. In order to enable these remote node accesses, these computer systems implement coherency transactions that take place between the nodes in order to maintain coherency between the nodes of the computer system.

The coherency transactions ensure that when a component of first node requests data from a memory of the computer system that the requesting component receives the latest copy of the data even if the data is cached in a component in a second node. These coherency transactions may take a considerable amount of time to complete. As a result, if a memory controller of a first node processes a memory request that requires a coherency request to be issued to a second node of the computer system, the memory controller may spend considerable time waiting for the coherency transaction to complete in the second node before the memory controller is able to complete the request.

What is needed therefore is a method and apparatus that enables memory requests to be processed while a coherency transaction for another memory request is being processed.

SUMMARY OF THE INVENTION

In accordance with one embodiment of the present invention, there is provided a method used by a memory controller to process requests to a memory. The method includes the steps of (a) receiving a first memory request from a first bus, (b) issuing a first coherency request on a second bus in order to process the first memory request, (c) storing the first coherency request in a storage area of the memory controller that is configured to receive memory requests from the second bus, and (d) processing the first coherency request from the storage area.

Pursuant to another embodiment of the present invention, there is provided a memory controller for processing memory requests received from a first bus and a second bus. The memory controller includes a first interface, a second interface, a first outbound queue, a second outbound queue, an arbiter, and an inbound queue. The first interface is configured to issue memory requests on the first bus and receive memory requests from the first bus. The second interface is configured to issue memory requests on the second bus and receive memory requests from the second bus. The first outbound queue is coupled to the first interface and is configured to store a first memory request received via the first interface. The arbiter is coupled to the first outbound queue and is configured to (a) select the first memory request for processing, and (b) generate a coherency request for the first memory request upon selecting the first memory request. The inbound queue is coupled to the second interface and is configured to store the coherency request until the second interface issues the coherency request on the second bus. The second outbound queue is coupled to the second interface and is configured to store the coherency request upon the second interface issuing the coherency request on the second bus.

It should be noted that the above queues are labeled as either being "inbound" or "outbound" with respect to the first bus and the second bus. For example, the first outbound queue receives requests that outbound from the first bus, and the inbound queue receives requests that are inbound to the second bus.

It is an object of the present invention to provide an improved method and apparatus for processing memory requests.

It is an object of the present invention to provide a new and useful method and apparatus for processing memory requests.

It is a further object of the present invention to provide a method and apparatus which efficiently processes requests to a memory.

It is yet a further object of the present invention to provide a method and apparatus which increases the performance of a computer system by reducing the average latency of memory requests.

It is yet a further object of the present invention to provide a method and apparatus which processes memory requests and coherency requests with the same hardware.

It is yet a further object of the present invention to provide a method and apparatus which processes memory request while maintaining coherency.

The above and other objects, features, and advantages of the present invention will become apparent from the following description and the attached drawings.

DETAILED DESCRIPTION OF A PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
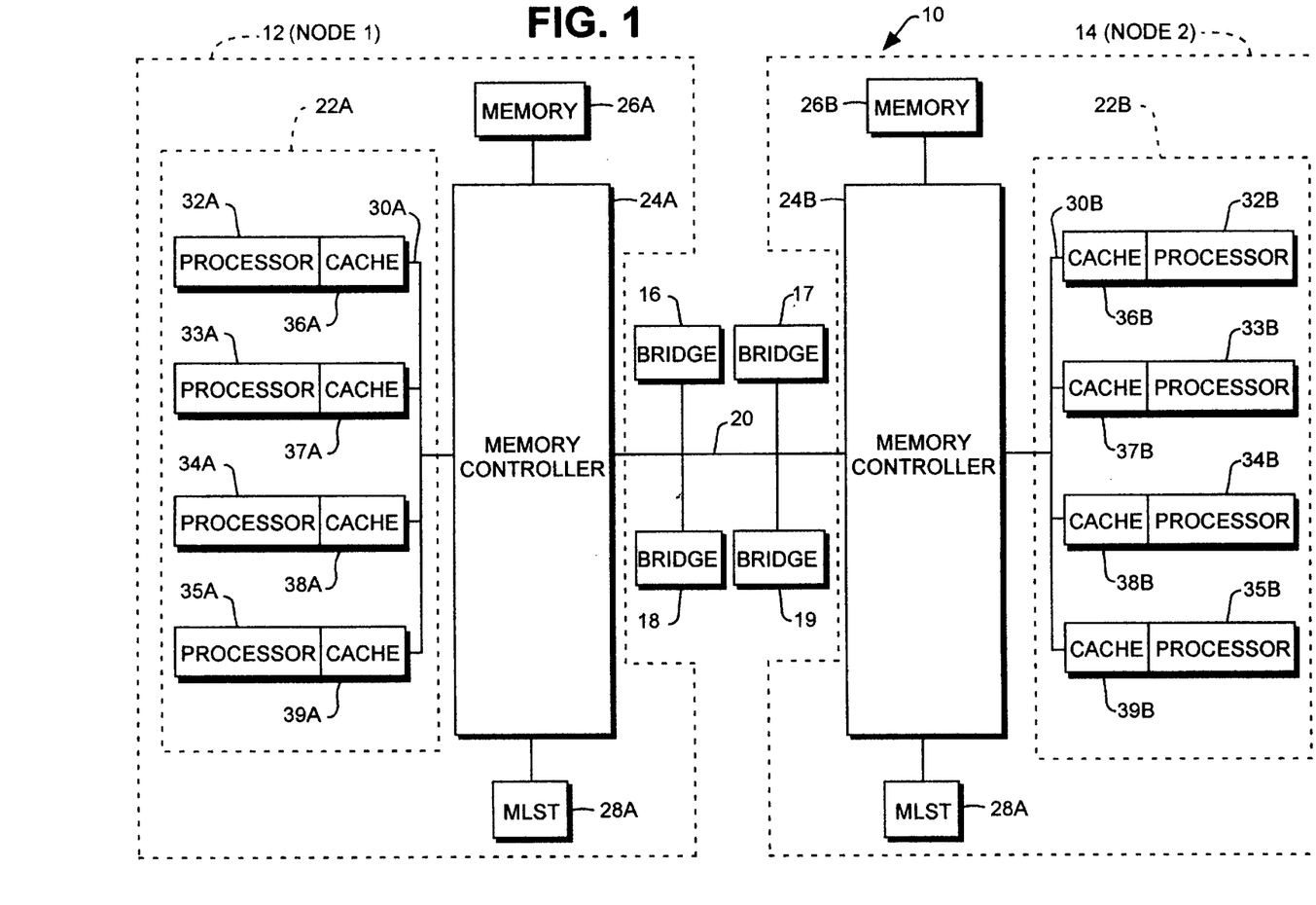
FIG. 1 shows a block diagram of a computer system which incorporates various features of the present invention therein.

A simplified block diagram of an exemplary computer system 10 which incorporates features of the present invention therein is shown in FIG. 1. The computer system 10 includes a first node 12, a second node 14, and an I/O bus 20 that couples the first node 12 to the second node 14. The first node 12 includes a first group of caching agents 22a, a first memory controller 24a, a first memory 26a, a first memory line status table (MLST) 28a, and a first processor bus 30a. The first group of caching agents 22a is operatively coupled to the first memory controller 24a by the first processor bus 30a, and the first memory 26a is operatively coupled to the first memory controller 24a. Furthermore, the first memory controller 24a is operatively coupled to the second node 14 by the I/O bus 20 and is further operatively coupled to the first MLST 28a.

The second node 14 includes a second group of caching agents 22b, a second memory controller 24b, a second memory 26b, a second MLST 28b, and a second processor bus 30b. The second group of caching agents 22b is operatively coupled to the second memory controller 24b by the second processor bus 30b, and the second memory 26b is operatively coupled to the second memory controller 24b. Furthermore, the second memory controller 24b is operatively coupled to the first node 12 by the I/O bus 20 and is further operatively coupled to the second MLST 28b.

The I/O bus 20 couples the bus bridges 16, 17, 18, and 19 to the first node 12 and the second node 14. The bus bridges 16, 17, 18, and 19 provide a mechanism for coupling I/O devices to the I/O bus 20. In the preferred embodiment, each of the bus bridges 16, 17, 18, and 19 is an Orion PCI Bridge (OPB), manufactured by Intel Corp. of Santa Cruz, Calif. An OPB provides an interface between a PCI bus and a Pentium Pro processor bus.

For purposes of clarity, a component is local to another component if both components are in the first node 12 or if both components are in the second node 14. On the other hand, a component is remote to another component if one component is in the first node 12 and the other component is in the second node 14. In other words, components of the same node are local to one another and components of different nodes are remote to one another. Furthermore, the bus bridges 16–19, which are not part of either the first node 12 or the second node 14, are considered to be remote to the first caching agents 22a and the second caching agents 22b since they are not directly coupled to the first processor bus 30a or the second processor bus 30b.

The first group of caching agents 22a includes four processors 32a–35a that are each coupled to a corresponding cache memory 36a–39a. Similarly the second group of caching agents includes four processors 32b–35b that are each coupled to a corresponding cache memory 36b–39b. The processors 32a–35a and 32b–35b, which are the computational and control components of the computer system 10, fetch, interpret, and execute instructions stored in the first memory 26a and the second memory 26b. The processors 32a–35a and 32b–35b also send and receive information over the processor buses 30a and 30b to and from other devices within the computer system 10. In a preferred embodiment the processors 32a–35a and 32b–35b are Pentium Pro™ processors which are commercially available from Intel Corporation of Santa Cruz, Calif.

The cache memories 36a–39a and 36b–39b are implemented with a small amount of very fast memory such as static random access memory (SRAM). The cache memories 36a–39a and 36b–39b include several cachelines for storing frequently accessed information (i.e. instructions and/or data). Each cacheline includes several words that may each store several bytes of information. For example, each cacheline in the preferred embodiment includes four words of sixty-four bits or eight bytes each. Furthermore, the cache memories 36a–39a and 36b–39b are implemented as writeback cache memories. In other words, information to be written to the first memory 26a or the second memory 26b is first stored in the cache memories 36a–39a and 36b–39b and is later transferred, in response to various conditions, to the first memory controller 24a or the second memory controller 24b for writing to the first memory 26a or the second memory 26b. In a preferred embodiment, the cache memories 36a–39a and 36b–39b have a capacity to store one megabyte of information and are implemented as the internal cache memory of the processors 32a–35a and 32b–35b; however, it should be appreciated that the cache memories 36a–39a and 36b–39b may be implemented as (1) external cache memory, (2) internal cache memory, (3) internal and external cache memory, or (4) several levels of cache memory.

The first memory 26a and the second memory 26b store information consisting of data and instructions. The first memory 26a and the second memory 26b generally consist of several megabytes of storage and are typically implemented with dynamic random access memory (DRAM). While DRAM is slower than SRAM, DRAM is also much cheaper. The first memory 26a and the second memory 26b each include several memory lines which include several addressable storage locations or memory locations. In the preferred embodiment, each memory line holds the same amount of information as each cacheline and transfers of information between the cache memories 36a–39a and 36b–39b and the first memory 26a and the second memory 26b typically occur a memory line at a time.

The advantage of a memory system which uses a hierarchy of faster cache memories 36a–39a and 36b–39b with slower first memory 26a and second memory 26b is that the memory system is both economical and efficient in processing memory requests. This advantage is a direct result of the spatial and temporal locality of reference principles. The spatial locality of reference principle contends that a small percentage of the first memory 26a and the second memory 26b is used a large percentage of the time. The temporal locality of reference principle contends that a memory location once referenced is likely to be referenced again within a short period of time. If these parts of the first memory 26a and the second memory 26b (or large part thereof) are stored in cache memories 36a–39a and 36b–39b, a large percentage of memory operations such as reads and writes may be performed directly to and from these faster cache memories 36a–39a.

For example, when a processor 32a–35a or 32b–35b requests information from a memory location of the first memory 26a or the second memory 26b, the processor 32a–35a or 32b–35b checks to see if a valid copy of the memory location is already in its corresponding cache memory 36–39a and 36b–39b. If a valid copy of the memory location is already in its corresponding cache memory 36–39a or 36b–39b, the processor 32a–35a or 32b–35b may acquire the information from the corresponding cache memory 36–39a or 36b–39b at a rate that is many times faster than the same acquisition from either the first memory 26a or the second memory 26b.

Ideally, the speed of the cache memories 36a–39a and 36b–39b is equal to the speed of the processors 32a–35a and 32b–35b in order to minimize the amount of time the processors 32a–35a and 32b–35b wait on memory operations. Hence, the cache memories 36a–39a and 36b–39b may effectively decrease the average latency of memory operations by speeding up a large percentage of memory operations. However, since both the cost of the memory system and the number of memory operations that may be performed directly to and from the cache memories 36a–39a and 36b–39b increases as the capacity of the cache memories 36a–39a and 36b–39b increases, the storage capacity of the cache memories 36a–39a and 36b–39b is a compromise between performance of the memory system and cost of the memory system.

The I/O bus 20 is a set of conductor lines that transmits information between the first memory controller 24a and the second memory controller 24b. Likewise, the first processor bus 30a is a set of conductor lines that transmits information between the first memory controller 24a and the first group of caching agents 22a, and the second processor bus 30b is a set of conductor lines that transmits information between the second memory controller 24b and the second group of caching agents 22b. In the preferred embodiment, the I/O bus 20, the first processor bus 30a, and the second processor bus 30b are pipe-lined split transaction buses (e.g. a Pentium Pro™ processor bus) in which memory operations are split into several phases such as an arbitration phase, a request phase, a snoop phase, a response phase, and a data phase, and in which several memory operations at different phases may be concurrently taking place.

The I/O bus 20, the first processor bus 30a, and the second processor bus 30b in the preferred embodiment perform similarly. Therefore, in order to simplify the following description of the various bus phases, only the operation of the first processor bus 30a will be described. One of the first bus phases of a typical memory operation is the arbitration phase. During the arbitration phase, the processors 32a–35a of the first group of caching agents 22a and the first memory controller 24a arbitrate for access to the first processor bus 30a. The winner of this arbitration phase is granted the right to issue a memory request during the following request phase.

After the arbitration phase comes the request phase. In the request phase, a processor 32a–35a of the first group of caching agents 22a or the first memory controller 24a issues on the first processor bus 30a a memory request (e.g. a read request, or a write request) that targets a memory location. Generally, the memory request includes an address and a request type. The address indicates which memory location the memory request is targeting, and the request type indicates the type of memory request (e.g. read, read for ownership, or write).

The snoop phase follows the request phase. During the snoop phase, each processor 32a–35a of the first group of caching agents 22a determines whether its corresponding cache memory 36a–39a has a valid copy of the targeted memory location and whether the processor 32a–35a must take some action in response to the memory request (e.g. invalidate cachelines, and/or transfer modified information stored in cachelines to the processor bus 30a). The processors 32a–35a of the first group of caching agents 22a make this determination by comparing the address issued during the request phase to addresses of the memory line copies stored in their corresponding cache memories 36a–39a.

The response phase follows the snoop phase. During the response phase, a response to the memory request is issued from the first memory controller 24a. The response indicates how the memory request will be handled. For example, the first memory controller 24a may indicate that the memory request is to be deferred, retried, or satisfied. If the memory request is to be deferred, the requested information will be supplied at some future time, thus freeing the first processor bus 30a for other memory requests. If the memory request is to be retried, the requesting processor 32a–35a is forced to re-issue the memory request. If the memory request is to be satisfied, the memory request continues to the data phase where information will be transferred in response to the memory request.

The data phase follows the response phase. During the data phase, information is transferred across the first processor bus 30a to fulfill the memory request. Depending upon the type of request and the contents of the cache memories 36a–39a of the first group of caching agents 22a, this transfer of information may be somewhat complicated due to the requirement that the cache memories 36a–39a remain coherent with the first memory 26a, the second memory 26b, and the cache memories 36b–39b of the second group of caching agents 22b.

Coherency methods or cache coherency methods refer to the methods that the computer system 10 utilizes to ensure that when a processor 32a–35a or 32b–35b requests information from a memory location, the requesting processor 32a–35a or 32b–35b receives a valid copy of the information (the latest, most up-to-date copy of the information). Since each of the cache memories 36a–39a and 36b–39b stores copies of memory lines, the computer system 10 must implement coherency methods to ensure that whenever a processor 32a–35a or 32b–35b requests information from the first memory 26a or the second memory 26b, the requesting processor 32a–35a or 32b–35b receives a valid copy of the requested information no matter where that valid copy resides (i.e. the cache memories 36a–39a and 36b–39b, the first memory controller 24a, the second memory controller 24b, the first memory 26a, or the second memory 26b).

The computer system 10 maintains coherency via: (a) coherency rules, (b) the first MLST 28a, (c) the second MLST 28b, (d) the various phases of the I/O bus 20, the first processor bus 30a, and the second processor bus 30b, and (e) memory intervention cycle (MIC) requests. MIC requests are essentially read or read invalidate requests that are issued by the first memory controller 24a and the second memory controller 24b in order to maintain coherency between the first node 12 and the second node 14.

One coherency rule of the preferred embodiment is that each cacheline and corresponding memory line stored therein is marked as being in one of four states: a "modified" state, an "exclusive" state, a "shared" state, or an "invalid" state. A cacheline is marked as being in the invalid state if the cacheline does not contain a valid copy of a memory line or has been requested to invalidate its copy of a memory line. A cacheline is marked as being in the shared state if the cacheline of a cache memory 36a–39a has a valid, unmodified copy of a memory line and another cacheline of another cache memory 36a–39a may also have a valid, unmodified copy of the same memory line. A cacheline is marked as being in the exclusive state if the cacheline has a valid, unmodified copy of a memory line and no other cacheline may have a valid, unmodified copy of the same memory line. Finally, a cacheline is marked as being in the modified state if the cacheline has a modified copy of a memory line that has not been written back to the first memory 26a or the second memory 26b.

Another coherency rule of the preferred embodiment is that a processor 32a–35a or 32b–35b may only modify a memory line stored in a cacheline if the cacheline was in a modified state or an exclusive state prior to the modification. In the preferred embodiment, a processor 32a–35a or 32b–35b may place a cacheline into the exclusive state by issuing a "read for ownership" request or a "read and invalidate" request upon its respective processor bus 30a or 30b. The "read for ownership" request causes a valid copy of the requested memory line to be placed into a cacheline of the cache memory 36a–39a or 36b–39b that corresponds to the requesting processor 32a–35a or 32b–35b and causes the cache memories 36a–39a and 36b–39b that do not correspond to the requesting processor 32a–35a or 32b–35b to invalidate any copy of the requested memory line that may reside in these non-corresponding cache memories 36a–39a and 36b–39b.

Furthermore, another coherency rule of the preferred embodiment is that the processors 32a–35a and 32b–35b and corresponding cache memories 36a–39a and 36b–39b are forced to writeback any modified memory line to the first memory 26a or the second memory 26b when the modified memory line is replaced or invalidated in the cache memories 36a–39a and 36b–39b. Yet another coherency rule of the preferred embodiment is that (a) MIC requests and (b) memory requests that generate writebacks from the cache memories 36a–39a and 36b–39b to their respective local memory controller 24a or 24b may not be deferred or retried, but may be stalled. The above combination of coherency rules ensures that a modified copy of a memory line is easily tracked and that only one of the cache memories 36a–39a and 36b–39b may contain a modified copy of a memory line, thus simplifying the determination of where valid data exists in the computer system 10.

One consequence of the above coherency rules is that a memory line that has been modified in a cacheline in the cache memory 36a is written back to the first memory 26a in response to a read or read invalidate type of request that targets the memory line, if the memory request is issued from a non-corresponding processor such as processors 33a–35a. A writeback in response to a read or read invalidate type of request is referred to as an implicit writeback. An implicit writeback is different than a normal writeback in that activities other than corresponding processor activities cause the writeback. In a normal writeback, a processor 32a–35a or 32b–35b may force its corresponding cache memory 36–39a and 36b–39b to writeback a modified memory line. Typically a processor 32a–35a or 32b–35b does a normal writeback in response to two situations: (a) a modified memory line is replaced with another memory line; or (b) the cache memory 36a–39a or 36b–39b has reached some triggering condition such as a time interval has expired or a certain percentage of the cache memory 36a–39a or 36b–39b contains modified memory lines.

While the above coherency rules and the various bus phases of the I/O bus 20, the first processor bus 30a, and the second processor bus 30b maintain coherency within a single node 12 or 14, the first MLST 28a, the second MLST 28b, and the MIC requests provide a mechanism for maintaining coherency across the first node 12 and the second node 14. The first MLST 28a and the second MLST 28b are each implemented in SRAM in the preferred embodiment. The first MLST 28a contains status information about each cached memory line of the first memory 26a (i.e. each memory line of the first memory 26a that is stored in the cache memories 36a–39a and 36b–39b). Likewise, the second MLST 28b contains status information about each cached memory line of the second memory 26b. The first memory controller 24a utilizes the information stored in the first MLST 28a to determine whether a memory request on the first processor bus 30a requires a MIC request be issued to the second memory controller 24b via the I/O bus 20. Likewise, the second memory controller 24b utilizes the information stored in the second MLST 28b to determine whether a memory request on the second processor bus 30b requires a MIC request be issued to the first memory controller 24a via the I/O bus 20.

In the preferred embodiment, each cached memory line is marked in either the first MLST 28a or the second MLST 28b as being in an "owned local" state, an "owned remote" state, a "shared local" state, or a "shared both" state. In particular, a memory line may be marked in the first MLST 28a as (a) "owned local" if a single cache memory 36a–39a of the first group of caching agents 22a may contain a copy of the memory line in the modified state or the exclusive state, (b) "owned remote" if a single cache memory 36b–39b of the second group of caching agents 22b may contain a copy of the memory line in the modified state or the exclusive state, (c) "shared local" if one or more cache memories 36a–39a of the first group of caching agents 22a may contain a copy of the memory line in the shared state or the invalid state, or (d) "shared both" if cache memories 36a–39a and 36b–39b of both the first group of caching agents 22a and the second group of caching agents 22b may contain a copy of the memory line in the shared state.

Likewise, a memory line may be marked in the second MLST 28b as (a) "owned local" if a single cache memory 36b–39b of the second group of caching agents 22b may contain a copy of the memory line in the modified state or the exclusive state, (b) "owned remote" if a single cache memory 36a–39a of the first group of caching agents 22a may contain a copy of the memory line in the modified state or the exclusive state, (c) "shared local" if one or more cache memories 36b–39b of the second group of caching agents 22b may contain a copy of the memory line in the shared state or the invalid state, or (d) "shared both" if cache memories 36a–39a and 36b–39b of both the first group of caching agents 22a and the second group of caching agents 22b may contain a copy of the memory line in the shared state.

In addition to the above states, the first memory controller 24a and the second memory controller 24b mark each memory line that is targeted by a pending MIC request as being in a transient state. The transient state essentially means that a MIC request for the marked memory line has been generated but has yet to complete. The first memory controller 24a and the second memory controller 24b use this transient state information to help simplify their respective coherency logic. In particular, the first memory controller 24a and the second memory controller 24b, if possible, retry any subsequent memory request that targets a memory line that is marked in the transient state. By doing so, the first memory controller 24a and the second memory controller 24b ensure that any subsequent memory request to the marked memory line will complete after the pending MIC request to the marked memory line, thus maintaining coherency. However, it should be appreciated from the above coherency rules that the first memory controller 24a and the second memory controller 24b may not retry or defer (a) MIC requests, or (b) memory requests that generate writebacks. As a result, the first memory controller 24a and the second memory controller 24b include additional coherency logic to deal with these requests.

The first memory controller 24a receives and processes memory requests from the first processor bus 30a and the I/O bus 20 and generally ensures that the memory request obtains the latest copy of the targeted memory line. To ensure that the memory requests obtain the latest copy of the targeted memory line, the first memory controller 24a may need to (a) obtain a copy of the targeted memory line from the first memory 26a, (b) allow a processor 32a–35a of the first group of caching agents 22a to deliver a copy of the targeted memory line from its corresponding cache memory 36a–39a, and/or (c) issue a MIC request to the second memory controller 24b via the I/O bus 20 in order to (i) obtain a copy of the targeted memory line from a cache memory 36b–39b of the second group of caching agents 22b, (ii) invalidate copies of the targeted memory line stored in cache memories 36b–39b of the second group of caching agents 22b, (iii) update the second MLST 28b, and/or (iv) obtain the targeted memory line from the second memory 26b.

The second memory controller 24b receives and processes memory requests from the second processor bus 30b and the I/O bus 20 and generally ensures that the memory requests obtain the latest copy of the targeted memory line. To ensure that the memory request obtains the latest copy of the targeted memory line, the second memory controller 24b may need to (a) obtain a copy of the targeted memory line from the second memory 26b, (b) allow a processor 36b–39b of the second group of caching agents 22b to deliver a copy of the targeted memory line from its corresponding cache memory 36b–39b, and/or (c) issue a MIC request to the first memory controller 24a via the I/O bus 20 in order to (i) obtain a copy of the targeted memory line from a cache memory 36a–39a of the first group of caching agents 22a, (ii) invalidate copies of the targeted memory line stored in cache memories 36a–39a of the first group of caching agents 22a, (iii) update the first MLST 28a, and/or (iv) obtain the targeted memory line from the first memory 26a.

Upon deciding to process a memory request, the first memory controller 24a checks and updates the information stored in the first MLST 28a in order to determine whether a MIC request is required for the selected request. Likewise, upon deciding to process a memory request, the second memory controller 24b checks and updates the information stored in the second MLST 28b in order to determine whether a MIC request is required for the selected request. For example, if the first memory controller 24a receives a read for ownership request for a memory line from processor 32a of the first group of caching agents 22a and the first MLST 28a indicates that the memory line is "owned remote," then the first memory controller 24a must issue a MIC request upon the I/O bus 20 in order to obtain the latest copy of the memory line and to invalidate any copy of the memory line that is stored in cache memories 36b–39b of the second group of caching agents 22b.

Figure 2:
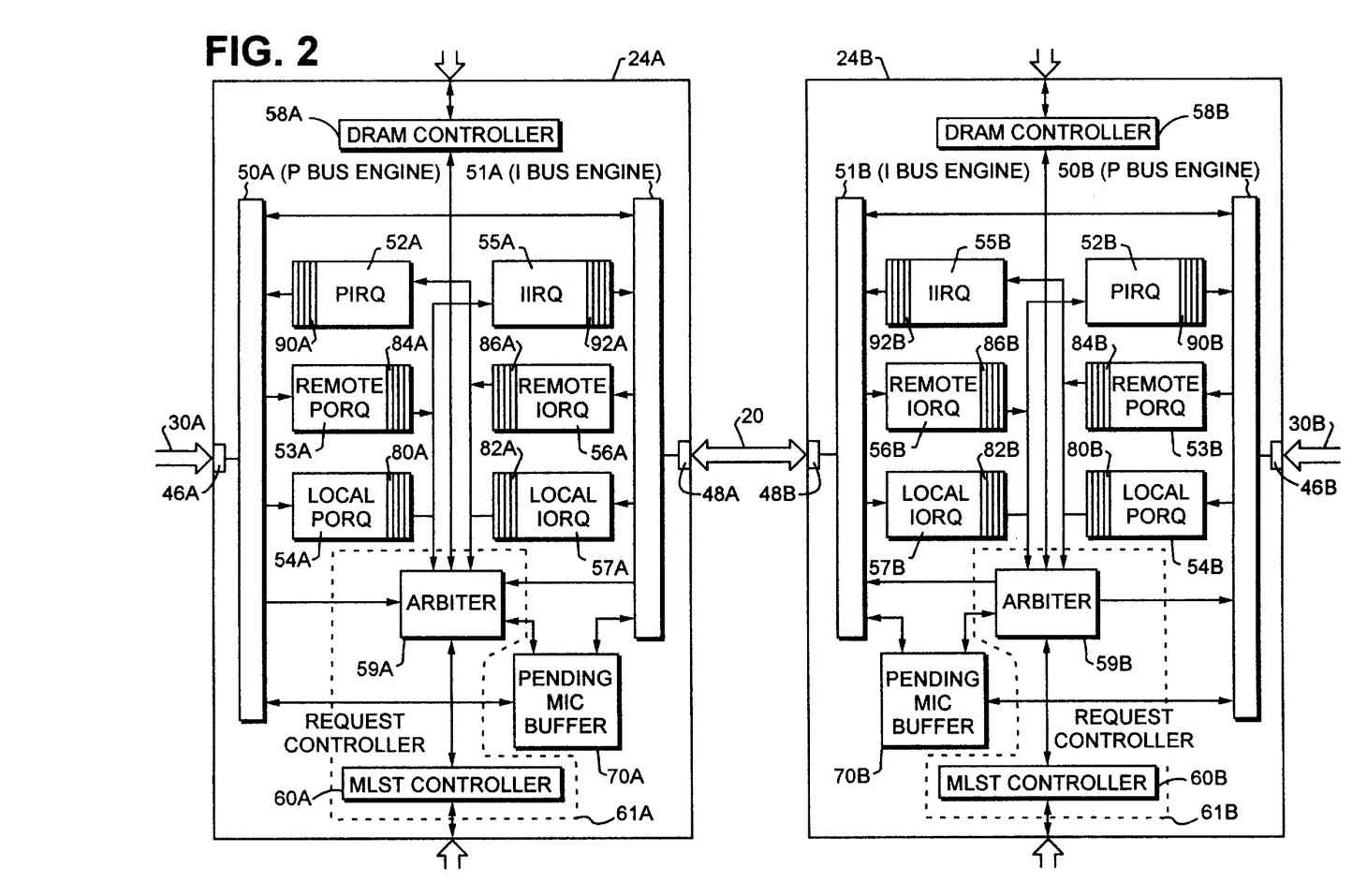
FIG. 2 shows a simplified block diagram of the memory controllers depicted in FIG. 1.

Referring now to FIG. 2, there is shown a simplified block diagram of the first memory controller 24a and the second memory controller 24b of FIG. 1. The first memory controller 24a includes a first P-bus port 46a, a first I-bus port 48a, a first P-bus engine 50a, a first I-bus engine 51a, a first DRAM controller 58a, a first request controller 61a, and a first pending MIC buffer 70a. The first memory controller 24a also includes a first processor bus inbound request queue (PIRQ) 52a, a first remote processor bus outbound request queue (remote PORQ) 53a, a first local processor bus outbound request queue (local PORQ) 54a, a first I/O bus inbound request queue (IIRQ) 55a, a first remote I/O bus outbound request queue (remote IORQ) 56a, and a first local I/O bus outbound request queue (local IORQ) 57a.

The first P-bus engine 50a is coupled to the first processor bus 30a of the computer system 10 via the first P-bus port 46a, and the first I-bus engine 51a is coupled to the I/O bus 20 via the first I-bus port 48a. The first DRAM controller 58a is coupled to the first memory 26a, and the first request controller 61a is coupled to the first MLST 28a. Furthermore, the first request controller 61a is coupled to (a) the first local PORQ 54a, (b) the first local IORQ 57a, (c) the first PIRQ 52a, (d) the first IIRQ 55a, (e) the first DRAM controller 58a, (f) the first P-Bus engine 50a, (g) the first I-Bus engine 51a, and (h) the first pending MIC buffer 70a.

The first PIRQ 52a, the first remote PORQ 53a, and the first local PORQ 54a are each coupled to the first P-bus engine 50a. Likewise, the first IIRQ 55a, the first remote IORQ 56a, and the first local IORQ 57a are each coupled to the first I-bus engine 51a. The first remote PORQ 53a is coupled to the first IIRQ 55a, and the first remote IORQ 56a is coupled to the first PIRQ 52b.

The second memory controller 24b includes a second P-bus port 46b, a second I-bus port 48b, a second P-bus engine 50b, a second I-bus engine 51b, a second DRAM controller 58b, a second request controller 61b, and a second pending MIC buffer 70b. The second memory controller 24b also includes a second PIRQ 52b, a second remote PORQ 53b, a second local PORQ 54b, a second IIRQ 55b, a second remote IORQ 56b, and a second local IORQ 57b.

The second P-bus engine 50b is coupled to the second processor bus 30b of the computer system 10 via the second P-bus port 46b, and the second I-bus engine 51b is coupled to the I/O bus 20 via the second I-bus port 48b. The second DRAM controller 58b is coupled to the second memory 26b, and the second request controller 61b is coupled to the second MLST 28b. Furthermore, the second request controller 61b is coupled to (a) the second local PORQ 54b, (b) the second local IORQ 57b, (c) the second PIRQ 52b, (d) the second IIRQ 55b, (e) the second DRAM controller 58b, (f) the second P-Bus engine 50b, (g) the second I-Bus engine 51b, and (h) the second pending MIC buffer 70b.

The second PIRQ 52b, the second remote PORQ 53b, and the second local PORQ 54b are each coupled to the second P-bus engine 50b. Likewise, the second IIRQ 55b, the second remote IORQ 56b, and the second local IORQ 57b are each coupled to the second I-bus engine 51b. The second remote PORQ 53b is coupled to the second IIRQ 55b, and the second remote IORQ 56b is coupled to the second PIRQ 52b.

Since the first memory controller 24a and the second memory controller 24b are essentially the same, only the first memory controller 24a will be described in further detail. In the preferred embodiment, each of the queues 52a–57a includes one or more storage locations configured to store memory requests. Also, each of the queues 52a–57a, and 52b–57b are labeled as either being "inbound" or "outbound" queues with respect to the buses 20, 30a, and 30b. For example, the first PIRQ 52a is labeled inbound because requests stored in the first PIRQ are headed inbound to the first processor bus 30a, and the first remote PORQ 54a is labeled outbound because requests stored in the first remote PORQ 54a were received outbound from the first processor bus 30a. Furthermore, in the preferred embodiment, each of the queues 52a–57a receives memory requests at a tail of the queue and outputs memory requests from a head of the queue in the order the queue received the memory requests.

In particular, the first PIRQ 52a (a) receives requests from the first local IORQ 57a and the first remote IORQ 56a and (b) relays requests to the first P-bus engine 50a. The first remote PORQ 53a receives requests from the P-bus engine 50a and passes the requests on to the IIRQ 55a. The first local PORQ 54a receives memory requests from the P-bus engine 50a and presents a received request to the first request controller 61a. The first IIRQ 55a (a) receives requests from the first request controller 61a and the first remote PORQ 53a and (b) relays requests to the first I-bus engine 51a. The first remote IORQ 56a receives requests from the first I-bus engine 51a and passes the requests on to the first PIRQ 52a. The local IORQ 57a receives memory requests from the I-bus engine 51a and presents a received request to the first request controller 61a.

The first P-bus engine 50a provides an interface between the first memory controller 24a and the first processor bus 30a. In providing the interface between the first memory controller 24a and the first processor bus 30a, the first P-bus engine 50a routes memory requests, monitors memory requests, and arbitrates for the first processor bus 30a. In particular, the first P-bus engine 50a routes memory requests from the first processor bus 30a to either the first remote PORQ 53a or the first local PORQ 54a depending upon the address of the memory request. If the address of a memory request indicates that the memory request targets the first memory 26a, then the first P-bus engine 50a causes the memory request to be stored in the first local PORQ 54a so that the first memory controller 24a may later process the request. However, if the address of a memory request indicates that the memory request targets the second memory 26b, then the first P-bus engine 50a causes the memory request to be stored in the first remote PORQ 53a so that the memory request may be propagated through to the second memory controller 24b via the first IIRQ 55a, the first I-bus engine 51a, and the I/O bus 20. Furthermore, the first P-bus engine 50a monitors the first processor bus 30a and generates a signal that indicates that the coherency phase (i.e. the snoop phase) for the memory request at the head 80a of the first local PORQ 54a has completed. In particular, the first P-bus engine 50a receives during the coherency phase of the memory request responses from each caching agent of the first group of caching agents 22a and determines from these responses whether the coherency phase for the memory request has completed. The first P-bus engine 50a also arbitrates for access to the first processor bus 30a so that the memory request at the head 90a of the first PIRQ 52a may be issued upon the first processor bus 30a.

The first I-bus engine 51a provides an interface between the first memory controller 24a and the I/O bus 20. In providing the interface between the first memory controller 24a and the I/O bus 20, the first I-bus engine 51a routes memory requests, monitors memory requests, arbitrates for the I/O bus 20, and wraps local MIC requests back into the first memory controller 24a. In particular, the first I-bus engine 51a routes memory requests from the I/O bus 20 to either the first remote IORQ 56a or the first local IORQ 57a depending upon the address and the type of the memory request. If the address of a memory request indicates that the memory request targets the first memory 26a, then the first I-bus engine 51a causes the memory request to be stored in the first local IORQ 57a so that the first memory controller 24a may later process the request. However, if the address and the type of a memory request indicate that the memory request is a MIC request that targets the second memory 26b, then the first I-bus engine 51a causes the memory request to be stored in the first remote IORQ 56a so that the memory request may be propagated through to the first group of caching agents 22a via the first PIRQ 52a, the first P-bus engine 50a, and the first processor bus 30a. Furthermore, the first I-bus engine 51a monitors the I/O bus 20 and generates a signal that indicates that the coherency phase (i.e. the snoop phase) for the memory request at the head 82a of the first local IORQ 57a has completed. The first I-bus engine 51a also arbitrates for access to the I/O bus 20 so that the memory request at the head 92a of the first IIRQ 55a may be issued upon the I/O bus 20. Furthermore, the first I-bus 51a when issuing a local MIC request from the first IIRQ 55a to the I/O bus 20 causes the local MIC request to be wrapped back into the first memory controller 24a and stored in the first local IORQ 57a for later processing by the first memory controller 24a.

The DRAM controller 58a of the first memory controller 24a controls the transfer of data to and from the first memory 26a. Furthermore, the pending MIC buffer 70a stores information about each MIC request pending (i.e. not yet completed) in the first memory controller 24a. In particular, the pending MIC buffer 70a stores address information for each pending MIC request that indicates which memory line the MIC request targets and status information that indicates that the targeted memory line is in a transient state.

The first request controller 61a in general controls the processing of requests from the first local PORQ 54a and the first local IORQ 57a. The first request controller 61a includes a first arbiter 59a and a first MLST controller 60a. The first MLST controller 60a of the first memory controller 24a controls the reads from and updates to the first MLST 28a. Furthermore, the first MLST controller 60a generates a MIC request and causes the MIC request to be placed in either the first PIRQ 52a or the first IIRQ 55a if in processing a memory request the first MLST 28a indicates that a MIC request is required for coherency. Finally, the first arbiter 59a selects requests for processing from either the head 80a of the first local PORQ 54a or the head 82a of the first local IORQ 57a. A preferred embodiment of the first arbiter 59a is described in further detail below with reference to FIG. 4.

Figure 3:
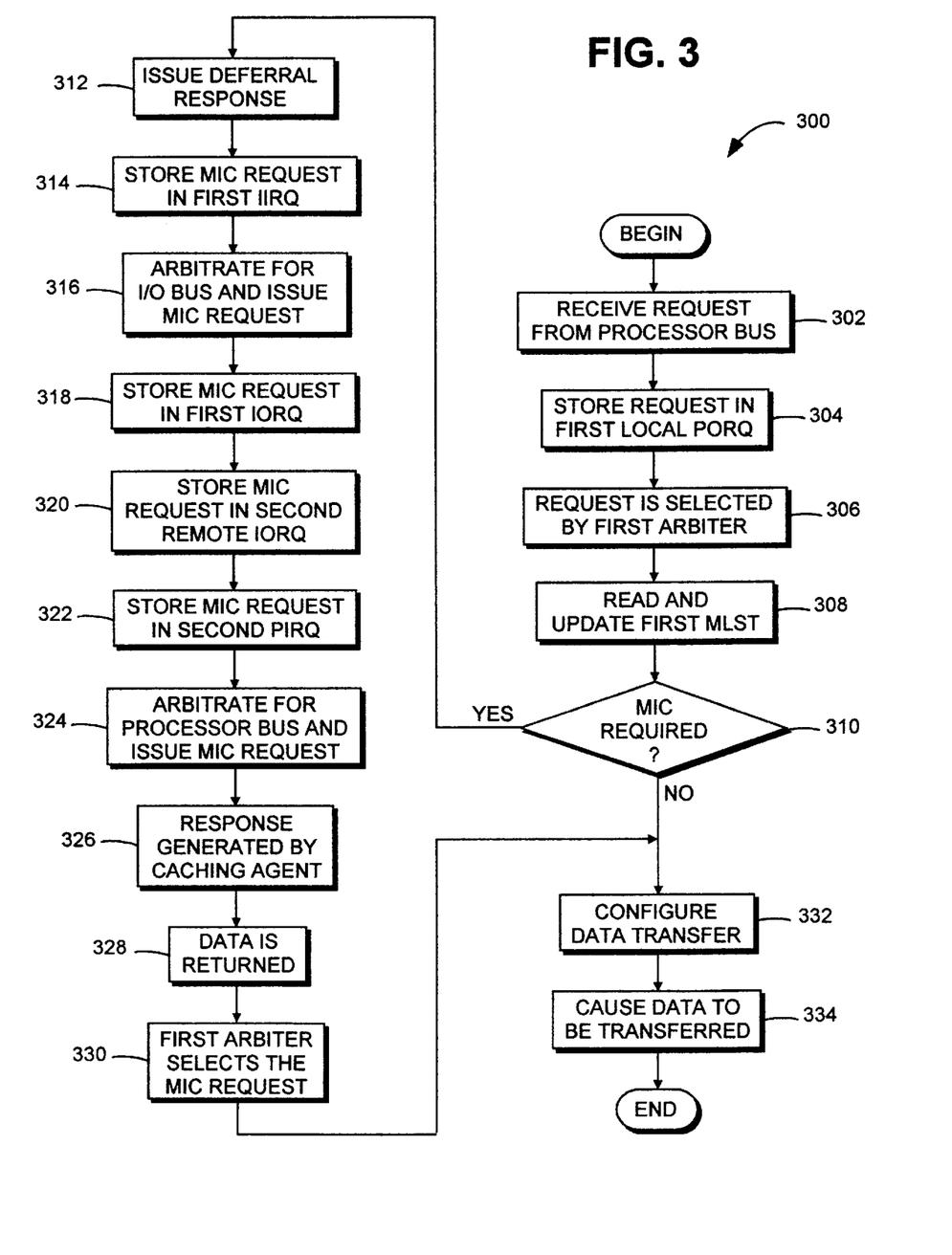
FIG. 3 shows a flowchart illustrating a preferred procedure for processing a first memory request from the first caching agents of FIG. 1.

In FIG. 3, there is shown a flowchart which illustrates a preferred procedure 300 for processing an exemplary first memory request from the first caching agents 22a that targets a memory line of the first memory 26a. In step 302, one of the caching agents of the first group of caching agents 22a issues a read for ownership request on the first processor bus 30a that targets a memory line of the first memory 26a which is received by the first P-bus engine 50a via the first P-bus port 46a. Since the first memory request targets the first memory 26a, the first P-bus engine 50a causes the first memory request to be stored in the first local PORQ 54a during step 304. The first memory request must work its way up to the head 80a of the first local PORQ 54a before it may be selected for processing. The first arbiter 59a in step 306 selects a memory request from either the head 80a of the first local PORQ 54a or the head 82a of the first local IORQ 57a. Before doing so, the first arbiter 59a must look in the pending MIC buffer 70a and determine whether a MIC request is already pending for the memory line targeted by the first memory request. If a MIC request for the targeted memory line is already pending, the first memory request cannot be processed until the MIC request is completed. For this example, it is assumed that no previous MIC request is pending. Furthermore, in order to simplify the discussion, the following assumes that the first arbiter 59a selected the first memory request from the head 80a of the local PORQ 54a.

In response to selecting the first memory request, in step 308 the first arbiter 59a obtains status information for the targeted memory line from the first MLST controller 60a and causes the first MLST controller 60a to update the status information for the targeted memory line in the first MLST 28a. In step 310, the first arbiter 59a determines from the status information for the targeted memory line and the request type of the first memory request whether a MIC request is required in order to process the first memory request.

If a MIC request is not required in order to process the first memory request, then the first memory controller 24a may proceed to step 332 in order to complete the first memory request. Depending on the request type of the first memory request and the snoop results obtained in processing the first memory request, the first memory controller 24a in step 332 may need to either configure the DRAM controller 58a to transfer the targeted memory line to the first memory 26a, to transfer the targeted memory line from the first memory 26a, or to transfer nothing due to one of the caching agents of the first group of caching agents 22a supplying the targeted memory line. Then in step 334, the requested memory line is transferred to the requesting caching agent, and if necessary the requested data is also transferred to the first memory 26a in order to maintain coherency.

If a MIC request, however, is required in order to process the first memory request, then in step 312 the first memory controller 24a issues during the response phase of the first memory request a response that indicates that the data phase will be deferred until later. By deferring the data phase until later, the first memory controller 24a may process other memory requests from the first local PORQ 54a while the MIC request is being resolved for the first memory request. Furthermore, in order to simplify the coherency logic of the first memory controller 24a in the preferred embodiment, any future memory request to the memory line targeted by the first memory request will be retried or not processed until the MIC request is resolved and the first memory request is completed.

In step 314 the first MLST controller 60a of the first request controller 61a causes an appropriate MIC request for the first memory request to be placed in the first IIRQ 55a. Also in step 314, the first request controller 61a places information in the pending MIC buffer 70a indicating that the first memory request is waiting for a MIC request to resolve. After the MIC request reaches the head 92a of the first IIRQ 55a, the I-Bus engine 51a in step 316 arbitrates for access to the I/O bus 20 in order to issue the MIC request on the I/O bus 20. After the I-Bus engine 51a is granted access to the I/O bus 20 and issues the MIC request upon the I/O bus 20, in step 318 the I-Bus engine 51a also places the MIC request into the local IORQ 57a. This issuing and wrapping back into the first local IORQ 57a causes the MIC request to be propagated along two paths; the MIC request is sent to the second memory controller 24b for processing and at the same time the MIC request is held by the first memory controller 24a to be completed later when the first arbiter 59a selects the MIC request from the first local IORQ 57a. The wrap-around feature simplifies the hardware required of the computer system 10 by treating a coherency operation like any other memory operation. Furthermore, by placing the MIC request in the first local IORQ 57a, the first memory controller 24a ensures that the MIC request will be processed by the first memory controller 24a before memory requests that are subsequently issued on the I/O bus 20 are processed, thus helping to maintain coherency.

In step 320, the second I-bus engine 51b of the second memory controller 24b receives the MIC request from the I/O bus 20. In response to receiving the MIC request, the second I-Bus engine 51b determines from the address of the MIC request that the MIC request does not map to the second memory 26b. As a result, the second I-bus engine 51b stores the MIC request in the second remote IORQ 56b. After the MIC request reaches the head 86a of the second remote IORQ 56b, the MIC request in step 322 is moved from the second remote IORQ 56b to the second PIRQ 52b so that the MIC request may be propagated through to the second group of caching agents 22b via the second processor bus 30b.

After the MIC request reaches the head 90b of the second PIRQ 52b, the second P-Bus engine 50b in step 324 arbitrates for access to the second processor bus 30b and once granted access to the second processor bus 30b issues the MIC request on the second processor bus 30b. The purpose of issuing the MIC request on the second processor bus 30b is to cause the caching agents of the second group of caching agents 22b to take appropriate action in response to the first memory request.

In step 326, each caching agent of the second group of caching agents 22b in response to the snoop phase of the MIC request generates a signal on the second processor bus 30b that indicates the status the targeted memory line in its corresponding cache memory 36b–39b. From these signals, each caching agent determines whether it must take some action in order to process the MIC request and the second memory controller 24b determines the action the second memory controller 24b must take in order to complete the MIC request. For example, since the first memory request is a read for ownership request, the MIC request on the second processor bus 30a will cause the caching agents of the second group of caching agents 22b to invalidate any copy of the memory line targeted by the first memory request and to transfer any modified copy of the first memory line to the second memory controller 24a. Assuming that one of the caching agents of the second group of caching agents 22b contains a copy of the targeted memory line in the modified state, the one caching agent in step 328 invalidates its copy of the targeted memory line and transfers the modified copy of the targeted memory line to the second controller 24b. In step 328, the second memory controller 24b propagates a snoop result that is determined from the signals generated in the snoop phase on the second processor bus 30b to the first memory controller 24a via the snoop phase of the MIC request on the I/O bus 20.

In step 330, after the MIC request reaches the head 82a of the first local IORQ 57a, the first arbiter 59a selects the MIC request for processing. Assuming that a caching agent of the second group of caching agents 22b transferred in step 328 a modified copy of the targeted memory line to the second memory controller 24b, the first memory controller 24a will receive the modified copy of the targeted memory line during the data phase of the MIC request on the I/O bus 20. Once the first memory controller 24a receives the requested memory line, the first memory controller 24a updates the pending MIC buffer 70a to indicate that the MIC request is no longer pending. Furthermore, once the first memory controller 24a receives the requested and memory line, the first memory controller 24a may complete the first memory request that was deferred in step 310 by placing in step 332 a deferred response request in the first PIRQ 52a. In step 334, the first PIRQ 52a arbitrates for and issues the deferred response request on the first processor bus 30a. The deferred response request causes the targeted memory line to be transferred from the first memory controller 24a to the requesting processor during the data phase of the request, thus completing the first memory request.

While the first memory controller 24a generally must participate in the snoop phase of memory transactions that occur on the first processor bus 30a and the I/O bus 20, the first memory controller 24a is not required to participate in the snoop phase of all memory requests. As stated above, a request phase that includes a request type precedes the snoop phase for a memory request. The first memory controller 24a, depending upon the request type, may be able to determine the snoop result without checking the first MLST 28a or participating in the snoop phase itself. Two such request types are an explicit writeback and a MIC request.

In the preferred embodiment of the present invention, a caching agent may not modify a memory line without first obtaining ownership of the memory line (i.e. obtaining a copy of the memory line in an exclusive or modified state within its corresponding cache). Furthermore, caching agents of the preferred embodiment only perform an explicit writeback in order to write valid, modified copies of memory lines back to the main memory 26a. As a result, the first memory controller 24a upon receiving an explicit writeback request from one of the first caching agents 22a may determine that the memory request will generate a snoop result of only one of the caching agents 22a having a valid, modified copy of the memory line and that the first MLST 28a will indicate that the memory line is "owned local." Any other snoop result would violate the coherency rules of the preferred embodiment. Since the first memory controller 24a need not participate in the snoop phase of the writeback request, the first memory controller 24a allows the first caching agents 22a to continue to resolve the snoop phase of the writeback request, while the first memory controller 24a processes a memory request on the I/O bus 20.

Furthermore, the first memory controller 24a need not participate in the coherency phase of a MIC request. MIC requests, that the first memory controller 24a processes, fall into one of two categories. The first category of MIC requests is MIC requests that the first memory controller 24a generated in order to maintain coherency with the second node 14. The first memory controller 24a need not participate in the coherency phase of this category of MIC requests because the first memory controller 24a has already determined its coherency action for the target memory line which was to generate and issue the MIC request. The second category of MIC requests is MIC requests that the first memory controller 24a received from the second memory controller 24b. The first memory controller 24a for these MIC requests is essentially a bridge between the second memory controller 24b and the first processor bus 30a. As a result, the first memory controller 24a need not participate in the coherency phase of this type of MIC request.

Due to the above, if the first arbiter 59a were to hold off selecting for processing these memory requests that do not require the first memory controller 24a to participate in the coherency phase of the request, the first arbiter 59a could select and the first memory controller 24a could process other requests while the coherency phase is resolved. As can be seen from the above description of procedure 300, the coherency phase of a MIC request may take a considerable amount of time due to the propagation of the MIC request to remote caching agents and the propagation of the snoop results of the remote caching agents back.

In a preferred embodiment, the first arbiter 59a takes advantage of the above properties in order to select requests from the first local PORQ 54a and the first local IORQ 57a in such a manner that the requests may be processed efficiently. In general, the first arbiter 59a looks at the head 80a of the first local PORQ 54a and the head 82a of the first local IORQ 57a and selects the memory request with the highest priority. Several memory requests such as requests that produce lock cycles or queue near full conditions are granted the highest priorities. However, if none of these type of requests are present, then the first arbiter 59a may attempt to select memory requests for the first memory controller 24a to process that will minimize the amount of time the first memory controller 24a participates in the processing of each memory requests. In order to make this selection, the first arbiter 59a obtains (a) coherency phase status information for the memory request at the head 80a of the first local PORQ 54a from the first P-bus engine 50a, and (b) coherency phase status information for the memory request at the head 82a of the first local IORQ 57a from the first I-bus engine 51a. From this information, the first arbiter 59a determines which memory request to select for processing. In the preferred embodiment, the first arbiter 59a is implemented as a priority encoder that assigns a priority level at least partially based upon whether the coherency phase of a memory request has completed for each request at the heads 80a and 82b and selects the memory request having the highest priority level.

Figure 4:
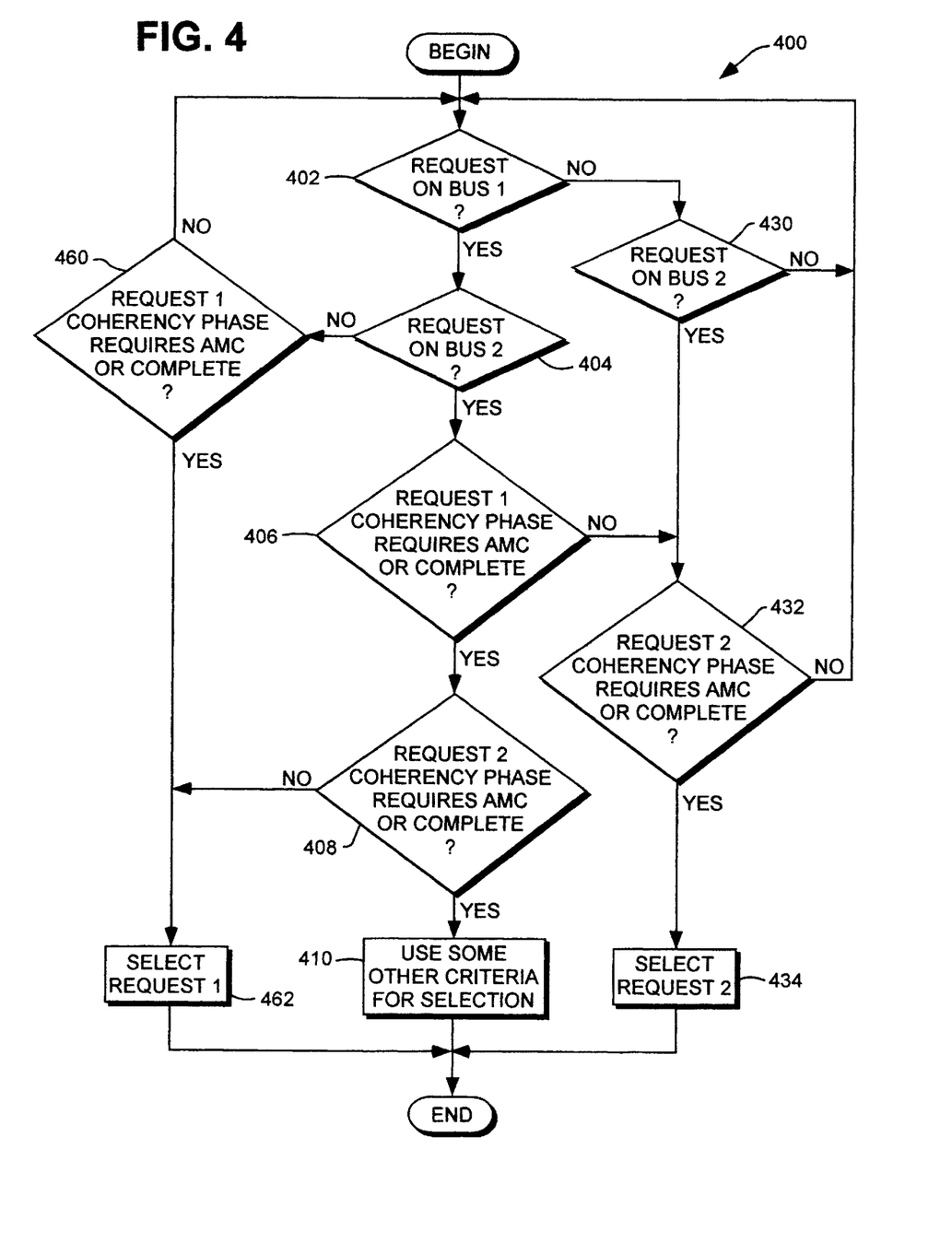
FIG. 4 shows a flowchart illustrating a preferred arbitration scheme used by the arbiters of FIG. 2.

Referring now to FIG. 4, there is shown a preferred arbitration scheme 400 that is utilized by the first arbiter 59a and the second arbiter 59b. As described below, the preferred arbitration scheme 400 assumes that the memory requests are not causing one of the higher priority situations such as a queue near full condition or lock cycle. In step 402, the first arbiter 59a determines whether a first memory request is at the head 80a of the first local PORQ 54a. If a first memory request is at the head 80a of the first local PORQ 54a, then the first arbiter 59a proceeds to step 404, otherwise the first arbiter 59a proceeds to step 430. The first arbiter 59a in step 404 determines whether a second memory request is present at the head 82a of the first local IORQ 57a. If a second memory request is at the head 82a of the first local IORQ 57a, then the first arbiter 59a proceeds to step 406, otherwise the first arbiter 59a proceeds to step 460.

By step 406, the first arbiter 59a has determined that the first memory controller 24a contains a first memory request in the first local PORQ 54a and a second memory request in the first local IORQ 57a. As a result, the first arbiter 59a must determine which request if any the first memory controller 24a should process. In step 406, the first arbiter 59a determines whether the first memory controller 24a is required to participate in the snoop phase (i.e. a coherency phase) of the first memory request or whether the snoop phase of the first memory request is complete. The first arbiter 59a determines whether the first memory controller 24a is required to participate in the snoop phase by examining the request type of the first memory request and determining whether the first memory request is of a type that requires the first memory controller 24a in order to obtain a valid snoop resolution. Furthermore, the first arbiter 59a determines whether the snoop phase of the first memory request has resolved by examining the snoop results of the first memory request or obtaining a snoop completion signal from the P-bus engine 50a. If the first arbiter 59a determines that the first memory controller 24a is required to participate in the snoop phase of the first memory request or that the snoop phase is complete, then the first arbiter 59a proceeds to step 408. However, if the first arbiter 59a determines that the first memory controller 24a is not required to participate in the snoop phase of the first memory request and the snoop phase of the first memory request is not complete then the first arbiter 59a proceeds to step 432.

By step 408, the first arbiter 59a has determined that the first memory request is still a candidate for processing. In step 408, the first arbiter 59a determines whether the first memory controller 24a is required to participate in the snoop phase (coherency phase) of the second memory request or whether the snoop phase of the second memory request is complete. The first arbiter 59a determines whether the first memory controller 24a is required to participate in the snoop phase by examining the request type of the second memory request and determining whether the second memory request is of a type that requires the first memory controller 24a in order to obtain a valid snoop resolution. Furthermore, the first arbiter 59a determines whether the snoop phase of the second memory request has resolved by examining the snoop results of the second memory request or obtaining a snoop completion signal from the I-bus engine 51a. If the first arbiter 59a determines that the first memory controller 24a is required to participate in the snoop phase of the second memory request or that the snoop phase is complete, then the first arbiter 59a proceeds to step 410. However, if the first arbiter 59a determines that the first memory controller 24a is not required to participate in the snoop phase of the second memory request and the snoop phase of the second memory request is not complete then the first arbiter 59a proceeds to step 462.

In step 410, the first arbiter 59a has determined that both the first memory request and the second memory request are candidates for processing. As a result, the first arbiter 59a must utilize other criteria for determining which memory request to process. The first arbiter 59a may chose several well known arbitration schemes at this point for selecting a request. The first arbiter 59a could prefer requests from one bus over the other, could process requests in a alternating fashion, or several other well known arbitration schemes.

The first arbiter 59a in step 430 determines whether a second memory request is present at the head 82a of the first local IORQ 57a. If a second memory request is at the head 82a of the first local IORQ 57a, then the first arbiter 59a proceeds to step 432. If a second memory request is not at the head 82a of the first local IORQ 57a, then the first arbiter 59a returns to step 402 because the first arbiter 59a does not have any memory requests from which to select. In essence the first arbiter 59a will repeatedly execute step 402 and step 430 until the first arbiter 59a has a memory request from which to select.

By step 432, the first arbiter 59a has determined that only the second memory request is a possible candidate for processing. In step 432, the first arbiter 59a determines whether the first memory controller 24a is required to participate in the snoop phase of the second memory request or whether the snoop phase of the second memory request is complete. The first arbiter 59a determines whether the first memory controller 24a is required to participate in the snoop phase by examining the request type of the second memory request and determining whether the second memory request is of a type that requires the first memory controller 24a in order to obtain a valid snoop resolution. Furthermore, the first arbiter 59a determines whether the snoop phase of the second memory request has resolved by examining the snoop results of the second memory request or obtaining a snoop completion signal from the I-bus engine 51a. If the first arbiter 59a determines that the first memory controller 24a is required to participate in the snoop phase of the second memory request or that the snoop phase is complete, then the first arbiter 59a proceeds to step 434. However, if the first arbiter 59a determines that the first memory controller 24a is not required to participate in the snoop phase of the second memory request and the snoop phase of the second memory request is not complete then the first arbiter 59a returns to step 402. By returning to step 402, the first arbiter 59a allows either a request from the first processor bus 30a or the I/O bus 20 to be processed while a snoop phase for a memory request completes.

By step 434, the first arbiter 59a has determined that the second memory request should be processed. As a result, the first arbiter 59a selects the second memory request for the first memory controller 24a to process.

By step 460, the first arbiter 59a has determined that only the first memory request is a possible candidate for processing. In step 460, the first arbiter 59a determines whether the first memory controller 24a is required to participate in the snoop phase of the first memory request or whether the snoop phase of the first memory request is complete. The first arbiter 59a determines whether the first memory controller 24a is required to participate in the snoop phase by examining the request type of the first memory request and determining whether the first memory request is of a type that requires the first memory controller 24a in order to obtain a valid snoop resolution. Furthermore, the first arbiter 59a determines whether the snoop phase of the first memory request has resolved by examining the snoop results of the second memory request or obtaining a snoop completion signal from the first P-bus engine 50a. If the first arbiter 59a determines that the first memory controller 24a is required to participate in the snoop phase of the first memory request or that the snoop phase is complete, then the first arbiter 59a proceeds to step 462. However, if the first arbiter 59a determines that the first memory controller 24a is not required to participate in the snoop phase of the first memory request and the snoop phase of the first memory request is not complete then the first arbiter 59a returns to step 402. By returning to step 402, the first arbiter 59a allows either a request from the first processor bus 30a or the I/O bus 20 to be processed while a snoop phase for a memory request completes.

By step 462, the first arbiter 59a has determined that the first memory request should be processed. As a result, the first arbiter 59a selects the first memory request for the first memory controller 24a to process. It should be appreciated that the arbitration scheme 400 was illustrated in a sequential form or the purpose of clarifying the arbitration logic. However, in the preferred embodiment, the first arbiter 59a is implemented in hardware with a priority encoder. As a result, the above decisions and steps of the arbitration scheme 400 happen in more of a concurrent manner with priorities being assigned to the first memory request and the second memory request as they are received at their respective heads.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method comprising:

issuing a first coherency transaction from a memory controller to be propagated along a remote path through a remote node of a computer system;

storing the first coherency transaction to be propagated along a local path in the memory controller simultaneous to propagation of the first coherency transaction along the remote path; and processing the first coherency transaction along the local path in the memory controller based upon the propagation of the first coherency transaction along the remote path.

2. The method of claim 1, prior to issuing the first coherency transaction, the method further comprises:

receiving a first local memory request at the memory controller from within a local node of the computer system;

storing the first local memory request;

determining that the first coherency transaction is needed to process the first local memory request;

deferring the first local memory request; and
generating the first coherency transaction.

3. The method of claim 2 further comprising:
processing at least one of an additional local memory request, an additional remote memory request, and an additional coherency transaction between receiving the first local memory request and processing the first coherency transaction.

4. The method of claim 2 wherein determining that the first coherency transaction is needed to process the first local memory request comprises:
accessing a status table indicating that a most current copy of a memory location associated with the first local memory request may be stored in the remote node; and
updating a pending coherency transaction buffer to indicate a transient state for a memory location associated with the first coherency transaction.

5. The method of claim 1 wherein the propagation of the first coherency transaction along the remote path causes a caching agent in the remote node to invalidate a copy of a memory line stored in the caching agent and associated with the first coherency transaction.

6. The method of claim 1 wherein the propagation of the first coherency transaction along the remote path causes a memory line associated with the first coherency transaction to be transferred to the memory controller.

7. The method of claim 1 wherein issuing the first coherency transaction comprises:
arbitrating for access to an input/output bus coupled to the remote node; and
issuing the first coherency transaction upon gaining access to the input/output bus.

8. The method of claim 1 wherein storing the first coherency transaction comprises:
adding the first coherency transaction to a tail end of a buffer storing additional remote memory requests and additional coherency transactions, if any, that are waiting to be processed.

9. The method of claim 1 wherein processing the first coherency transaction comprises:
updating a pending coherency transaction buffer to reflect an updated state for a memory location associated with the first coherency transaction based upon completion of the first coherency transaction propagated along the remote path through the remote node;
accessing the pending coherency transaction buffer to determine if a state for the memory location has been updated; and
selecting the first coherency transaction for processing through the local path based at least in part on the updated state.

10. The method of claim 9 further comprising:
processing additional remote requests and additional coherency transactions, if any, stored in a buffer prior to storing the first coherency transaction; and
wherein selecting the first coherency transaction comprises selecting the first coherency transaction from a head end of the buffer.

11. A memory controller comprising:
an input/output bus engine to issue a first coherency transaction from the memory controller to be propagated along a remote path through a remote node of a computer system, and to store the first coherency transaction to be propagated along a local path in the memory controller simultaneous to propagation of the first coherency transaction along the remote path; and
a request controller to process the first coherency transaction along the local path in the memory controller based upon the propagation of the first coherency transaction along the remote path.

12. The memory controller of claim 11 further comprises:
a processor bus engine to receive a first local memory request at the memory controller from within a local node of the computer system; and
a first request queue to store the first local memory request;
wherein the request controller is to determine that the first coherency transaction is needed to process the first local memory request, defer the first local memory request, and generate the first coherency transaction.

13. The memory controller of claim 12 wherein the request controller is to process at least one of an additional local memory request, an additional remote memory request, and an additional coherency transaction between determining that the first coherency transaction is needed and processing the first coherency transaction.

14. The memory controller of claim 12 wherein, to determine that the first coherency transaction is needed to process the first local memory request, the request controller is to access a status table indicating that a most current copy of a memory location associated with the first local memory request may be stored in the remote node, and update a pending coherency transaction buffer to indicate a transient state for a memory location associated with the first coherency transaction.

15. The memory controller of claim 11 wherein the propagation of the first coherency transaction along the remote path causes a caching agent in the remote node to invalidate a copy of a memory line stored in the caching agent and associated with the first coherency transaction.

16. The memory controller of claim 11 wherein the propagation of the first coherency transaction along the remote path causes a memory line associated with the first coherency transaction to be transferred to the memory controller.

17. The memory controller of claim 11 wherein, to issue the first coherency transaction, the input/out bus engine is to arbitrate for access to an input/output bus coupled to the remote node, and issue the first coherency transaction upon gaining access to the input/output bus.

18. The memory controller of claim 11 wherein, to store the first coherency transaction, the input/out bus engine is to add the first coherency transaction to a tail end of a buffer storing additional remote memory requests and additional coherency transactions, if any, that are waiting to be processed.

19. The memory controller of claim 11 wherein, to process the first coherency transaction, the request controller is to update a pending coherency transaction buffer to reflect an updated state for a memory location associated with the first coherency transaction based upon completion of the first coherency transaction propagated along the remote path through the remote node, access the pending coherency transaction buffer to determine if a state for the memory location has been updated, and select the first coherency transaction for processing through the local path based at least in part on the updated state.

20. The memory controller of claim 19 wherein the request controller is further to process additional remote requests and additional coherency transactions, if any, stored in a buffer prior to storing the first coherency transaction, and
wherein, to select the first coherency transaction, the request controller is to select the first coherency transaction from a head end of the buffer.

21. An apparatus comprising:
- means for issuing a first coherency transaction from a memory controller to be propagated along a remote path through a remote node of a computer system;
- means for storing the first coherency transaction to be propagated along a local path in the memory controller simultaneous to propagation of the first coherency transaction along the remote path; and
- means for processing the first coherency transaction along the local path in the memory controller based upon the propagation of the first coherency transaction along the remote path.

22. The apparatus of claim 21, further comprising:
- means for receiving a first local memory request at the memory controller from within a local node of the computer system;
- means for storing the first local memory request;
- means for determining that the first coherency transaction is needed to process the first local memory request;
- means for deferring the first local memory request; and
- means for generating the first coherency transaction.

23. The apparatus of claim 22 wherein the means for processing is to process at least one of an additional local memory request, an additional remote memory request, and an additional coherency transaction between receiving the first local memory request and processing the first coherency transaction.

24. The apparatus of claim 21 wherein the means for processing the first coherency transaction comprises:
- means for updating a pending coherency transaction buffer to reflect an updated state for a memory location associated with the first coherency transaction based upon completion of the first coherency transaction propagated along the remote path through the remote node;
- means for accessing the pending coherency transaction buffer to determine if a state for the memory location has been updated; and
- means for selecting the first coherency transaction for processing through the local path based at least in part on the updated state.

25. The apparatus of claim 24 wherein the means for processing is to process additional remote requests and additional coherency transactions, if any, stored in a buffer prior to the first coherency transaction, and
- wherein the means for selecting the first coherency transaction is to select the first coherency transaction from a head end of the buffer.

* * * * *

UNITED STATES PATENT AND TRADEMARK OFFICE
CERTIFICATE OF CORRECTION

PATENT NO. : 6,070,231  
DATED : May 30, 2000  
INVENTOR(S) : Ottinger

It is certified that error appears in the above-identified patent and that said Letters Patent is hereby corrected as shown below:

Column 14,  
Line 45, delete "and".

Column 18,  
Lines 57-58, delete "the propagation", insert -- a coherency phase status --.

Column 20,  
Line 3, delete "the propagation", insert -- a coherency phase status --.  
Line 39, delete "out", insert -- output --.  
Line 44, delete "out", insert -- output --.

Column 21,  
Lines 10-11, delete "the propagation", insert -- a coherency phase status --.

Signed and Sealed this

Twenty-second Day of October, 2002

Attest:

JAMES E. ROGAN  
Attesting Officer    Director of the United States Patent and Trademark Office